US012462062B2

(12) United States Patent
Herman (10) Patent No.: US 12,462,062 B2
(45) Date of Patent: Nov. 4, 2025

(54) ANONYMIZING PERSONALLY IDENTIFIABLE INFORMATION IN IMAGE DATA

(71) Applicant: Ford Global Technologies, LLC, Dearborn, MI (US)

(72) Inventor: David Michael Herman, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 18/464,492

(22) Filed: Sep. 11, 2023

(65) Prior Publication Data

US 2025/0086315 A1   Mar. 13, 2025

(51) Int. Cl.
| | |
|---|---|
| *G06F 21/62* | (2013.01) |
| *G06T 9/00* | (2006.01) |
| *G06V 10/25* | (2022.01) |
| *G06V 20/56* | (2022.01) |
| *G06V 40/16* | (2022.01) |

(52) U.S. Cl.
CPC ............ *G06F 21/6254* (2013.01); *G06T 9/00* (2013.01); *G06V 10/25* (2022.01); *G06V 20/56* (2022.01); *G06V 40/161* (2022.01)

(58) Field of Classification Search
None
See application file for complete search history.

(56) References Cited

U.S. PATENT DOCUMENTS

| | | | |
|---|---|---|---|
| 8,571,354 B2 | 10/2013 | Miksa et al. | |
| 11,447,127 B2 * | 9/2022 | Tawari | G06V 10/764 |
| 2019/0228182 A1 * | 7/2019 | Einecke | G06F 21/6254 |
| 2019/0287217 A1 * | 9/2019 | Cooke | G06N 3/045 |
| 2021/0258547 A1 * | 8/2021 | Kawabe | G03B 25/00 |
| 2022/0172416 A1 * | 6/2022 | Kuta | G06F 21/6254 |
| 2022/0172517 A1 * | 6/2022 | Kuta | G06V 10/82 |
| 2022/0297705 A1 | 9/2022 | Duplys | |
| 2022/0382903 A1 | 12/2022 | Herman et al. | |
| 2023/0027783 A1 * | 1/2023 | Kuta | G06F 21/6254 |
| 2025/0005912 A1 * | 1/2025 | Ngan | G06V 40/172 |
| 2025/0069297 A1 * | 2/2025 | Zhang | G06T 11/60 |

FOREIGN PATENT DOCUMENTS

DE    102019206233 A1    11/2020

OTHER PUBLICATIONS

"Automated Video Anonymization at scale," https://sightengine.com/video-anonymization, Jun. 21, 2023, 9 pages.

\* cited by examiner

*Primary Examiner* — Joshua Joo
(74) *Attorney, Agent, or Firm* — Frank Lollo; Brooks Kushman P.C.

(57) ABSTRACT

A computer includes a processor and a memory. The memory stores instructions executable by the processor. The computer identifies personally identifiable information (PII) in an initial image frame. The computer encodes a region containing the PII of the initial image frame to a latent vector with a lower dimensionality than the region. The computer anonymizes the region from the initial image frame, resulting in a modified image frame. The computer associates: the latent vector with the modified image frame.

19 Claims, 5 Drawing Sheets

ANONYMIZING PERSONALLY IDENTIFIABLE INFORMATION IN IMAGE DATA

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (lidar) devices, and image processing sensors such as cameras.

DETAILED DESCRIPTION

The system and techniques described herein can provide anonymization of personally identifiable information (PII) in image frames, while preserving the usefulness of the image frame for executing or training machine-learning perception algorithms such as object detection. Examples of personally identifiable information (PII) in image data include images of faces, images of signs or text such as license plates, etc. The removal of PII from image data may be more respectful of individuals' privacy, but removal may also remove data that is useful for training or executing a perception algorithm. As described in this disclosure, a computer is programmed to identify PII in an initial image frame; encode a region containing the PII of the initial image frame to a latent vector with a lower dimensionality than the region; anonymize the region from the initial image frame, resulting in a modified image frame; and associate the latent vector with the modified image frame. The latent vector can preserve such data, e.g., an identification of an object as a face or license plate, an orientation of the face, a color scheme of the license plate, etc., thereby keeping that data with the image frame that could be used for a perception task. At the same time, the techniques herein can remove features that may be used for, e.g., uniquely identifying a specific individual. The techniques herein thus provide anonymization of PII from image data together with strong performance for perception algorithms using the image data.

A computer includes a processor and a memory, and the memory stores instructions executable by the processor to identify personally identifiable information (PII) in an initial image frame; encode a region containing the PII of the initial image frame to a latent vector with a lower dimensionality than the region; anonymize the region from the initial image frame, resulting in a modified image frame; and associate the latent vector with the modified image frame.

In an example, the instructions may further include instructions to actuate a component of a vehicle based on the modified image frame with the latent vector. In a further example, the instructions may further include instructions to receive the initial image frame from a camera of the vehicle.

In another further example, the instructions may further include instructions to execute a machine-learning perception algorithm using the modified image frame with the latent vector as an input, and actuate the component based on an output of the machine-learning perception algorithm.

In an example, the instructions may further include instructions to execute a machine-learning perception algorithm using the modified image frame with the latent vector as an input. In a further example, the instructions may further include instructions to execute the machine-learning perception algorithm using the initial image frame and the modified image frame with the latent vector as inputs.

In an example, the instructions may further include instructions to embed the latent vector in the modified image frame.

In an example, the modified image frame with the latent vector may have a same dimensionality as the initial image frame.

In an example, the instructions may further include instructions to transmit the modified image frame with the latent vector to a remote server. In a further example, the instructions may further include instructions to refrain from transmitting the initial image frame to the remote server.

In an example, the PII may include a face of a person. In a further example, the latent vector may encode non-personally identifying data about the face.

In an example, the PII may include a depiction of text.

In an example, the instructions may further include instructions to execute a machine-learning encoder on the PII to encode the PII to the latent vector. In a further example, the machine-learning encoder may be trained as part of an encoder-decoder architecture to reconstruct the region of the initial image frame. In a yet further example, the encoder-decoder architecture may be trained using a loss function that includes a reconstruction loss measuring similarity between an output of the encoder-decoder architecture and the region of the initial image frame inputted to the encoder-decoder architecture.

In another further example, the instructions may further include instructions to execute a machine-learning perception algorithm using the modified image frame with the latent vector as an input, and the machine-learning perception algorithm may be jointly trained with the machine-learning encoder. In a yet further example, the machine-learning perception algorithm and the machine-learning encoder may be jointly trained with the latent vector outputted by the machine-learning encoder being inputted to the machine-learning perception algorithm.

In another yet further example, the machine-learning perception algorithm and the machine-learning encoder may be jointly trained using a loss function that includes a loss measuring an accuracy at correctly identifying objects in input image frames.

With reference to the Figures, wherein like numerals indicate like parts throughout the several views, a computer 105, 145 includes a processor and a memory, and the memory stores instructions executable by the processor to identify personally identifiable information (PII) 205 in an initial image frame 200; encode a region 210 containing the PII 205 of the initial image frame 200 to a latent vector 220 with a lower dimensionality than the region 210; anonymize the region 210 from the initial image frame 200, resulting in a modified image frame 225; and associate the latent vector 220 with the modified image frame 225.

Figure 1:
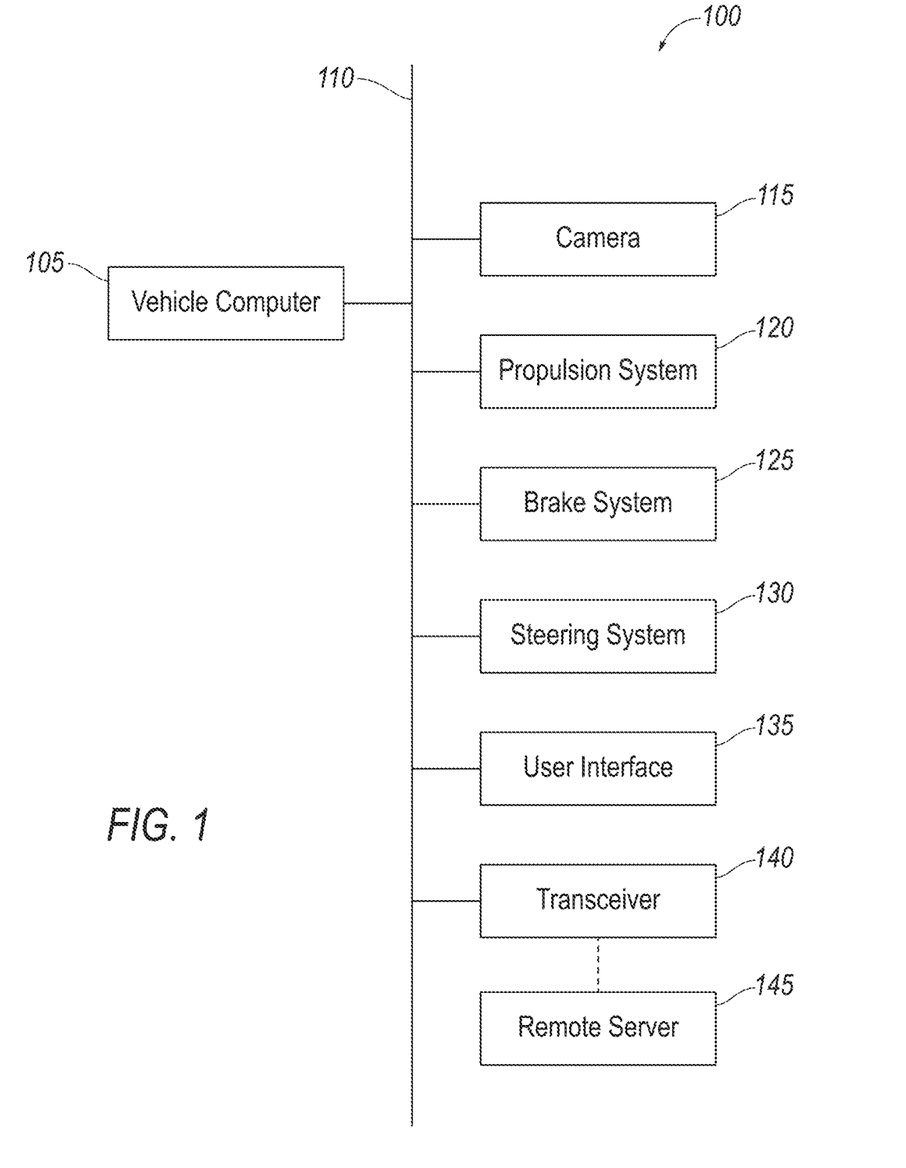
FIG. 1 is a block diagram of an example vehicle in communication with a remote server.

With reference to FIG. 1, the techniques herein may be performed partially or fully on board a vehicle 100. The vehicle 100 may be any passenger or commercial automobile such as a car, a truck, a sport utility vehicle, a crossover, a van, a minivan, a taxi, a bus, etc. The vehicle 100 may include a vehicle computer 105, a communications network 110, a camera 115, a propulsion system 120, a brake system 125, a steering system 130, a user interface 135, and a transceiver 140.

The vehicle computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 105 can thus include a processor, a memory, etc. The memory of the vehicle computer 105 can include media for storing instructions executable by the processor as well as for electronically storing data and/or databases, and/or the vehicle computer 105 can include structures such as the foregoing by which programming is provided. The vehicle computer 105 can be multiple computers on board the vehicle 100 coupled together.

The vehicle computer 105 may transmit and receive data through the communications network 110. The communications network 110 may be, e.g., a controller area network (CAN) bus, Ethernet, WiFi, Local Interconnect Network (LIN), onboard diagnostics connector (OBD-II), and/or any other wired or wireless communications network. The vehicle computer 105 may be communicatively coupled to the camera 115, the propulsion system 120, the brake system 125, the steering system 130, the user interface 135, the transceiver 140, and other components of the vehicle 100 via the communications network 110.

The camera 115 can detect electromagnetic radiation in some range of wavelengths. For example, the camera 115 may detect visible light, infrared radiation, ultraviolet light, or some range of wavelengths including visible, infrared, and/or ultraviolet light. For example, the camera 115 can be a charge-coupled device (CCD), complementary metal oxide semiconductor (CMOS), or any other suitable type. For another example, the camera 115 may be a time-of-flight (TOF) camera, which includes a modulated light source for illuminating the environment and detects both reflected light from the modulated light source and ambient light to sense reflectivity amplitudes and distances to the scene.

The propulsion system 120 of the vehicle 100 generates energy and translates the energy into motion of the vehicle 100. The propulsion system 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 120 can include an electronic control unit (ECU) or the like that is in communication with and receives input from the vehicle computer 105 and/or a human operator. The human operator may control the propulsion system 120 via, e.g., an accelerator pedal and/or a gear-shift lever.

The brake system 125 is typically a conventional vehicle braking subsystem and resists the motion of the vehicle 100 to thereby slow and/or stop the vehicle 100. The brake system 125 may include friction brakes such as disc brakes, drum brakes, band brakes, etc.; regenerative brakes; any other suitable type of brakes; or a combination. The brake system 125 can include an electronic control unit (ECU) or the like that is in communication with and receives input from the vehicle computer 105 and/or a human operator. The human operator may control the brake system 125 via, e.g., a brake pedal.

The steering system 130 is typically a conventional vehicle steering subsystem and controls the turning of the wheels. The steering system 130 may be a rack-and-pinion system with electric power-assisted steering, a steer-by-wire system, as both are known, or any other suitable system. The steering system 130 can include an electronic control unit (ECU) or the like that is in communication with and receives input from the vehicle computer 105 and/or a human operator. The human operator may control the steering system 130 via, e.g., a steering wheel.

The user interface 135 presents information to and receives information from an operator of the vehicle 100. The user interface 135 may be located, e.g., on an instrument panel in a passenger compartment of the vehicle 100, or wherever may be readily seen by the operator. The user interface 135 may include dials, digital readouts, screens, speakers, and so on for providing information to the operator, e.g., human-machine interface (HMI) elements such as are known. The user interface 135 may include buttons, knobs, keypads, microphone, and so on for receiving information from the operator.

The transceiver 140 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 140 may be adapted to communicate with a remote server 145, that is, a server distinct and spaced from the vehicle 100. The transceiver 140 may be one device or may include a separate transmitter and receiver.

The remote server 145 may be located outside the vehicle 100. For example, the remote server 145 may be associated with another vehicle (e.g., V2V communications), an infrastructure component (e.g., V2I communications), an emergency responder, a mobile device associated with the owner of the vehicle 100, a fleet manager or manufacturer of the vehicle 100, etc. The remote server 145 is a microprocessor-based computing device, e.g., a generic computing device including a processor and a memory. The memory of the remote server 145 can include media for storing instructions executable by the processor as well as for electronically storing data and/or databases, and/or the remote server 145 can include structures such as the foregoing by which programming is provided. The remote server 145 can be multiple computers coupled together.

Except where noted, the techniques described below may be performed by the vehicle computer 105, the remote server 145, or a combination of the vehicle computer 105 and the remote server 145, e.g., earlier steps by the vehicle computer 105 and later steps by the remote server 145. At whatever step the remote server 145 takes over, the vehicle computer 105 may instruct the transceiver 140 to transmit the necessary data from earlier steps to the remote server 145. If a step may be performed by either the vehicle computer 105 or the remote server 145, this disclosure refers to them collectively as the computer 105, 145. Performing the steps on the vehicle computer 105 provides the advantage that the PII 205 is not being transmitted away from the vehicle 100.

Figure 2:
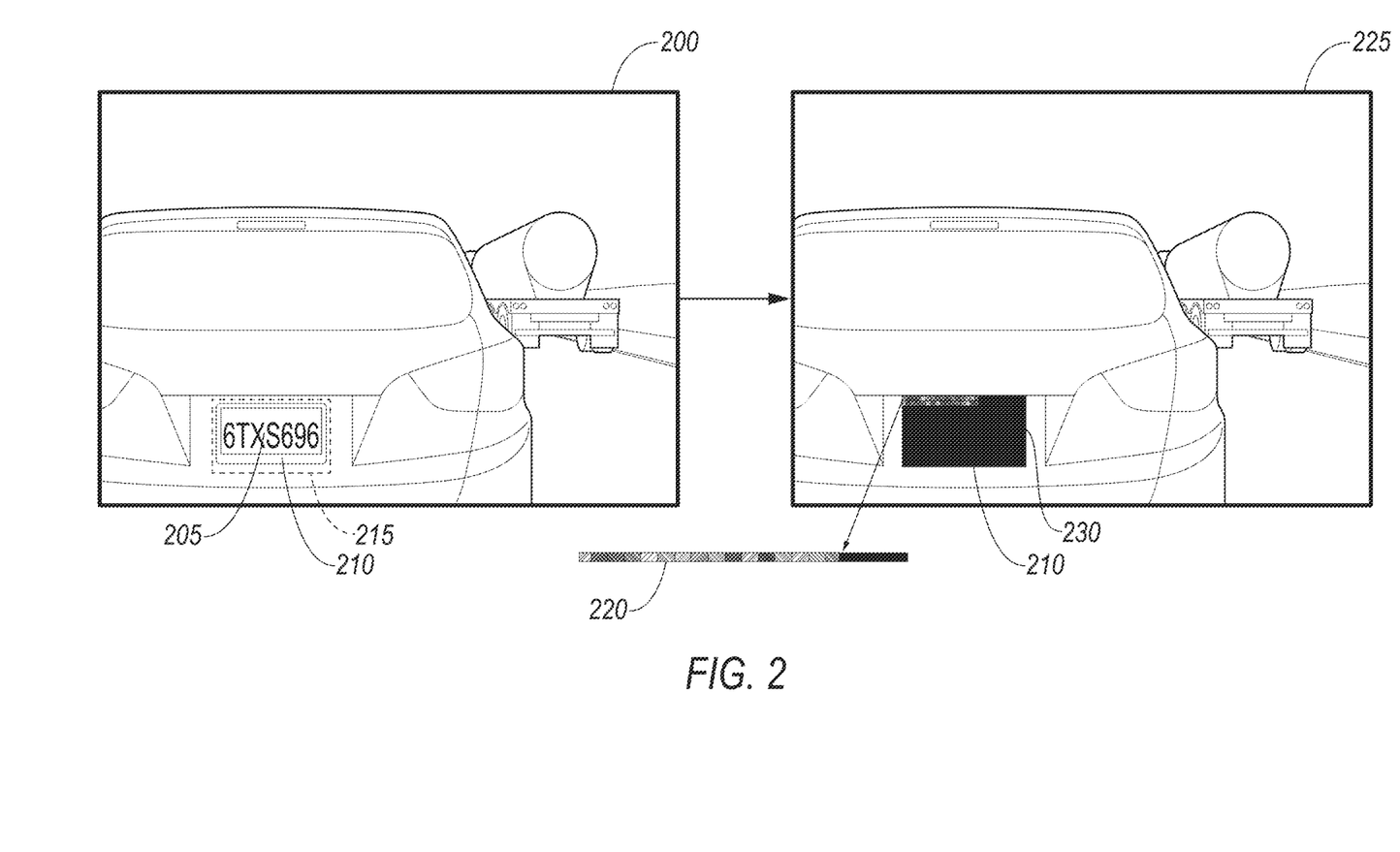
FIG. 2 is a depiction of an example image frame before and after removing personally identifiable information and encoding a latent vector.

With reference to FIG. 2, the computer 105, 145 is programmed to receive an initial image frame 200 from the camera 115, e.g., image data including a plurality of initial image frames 200. The term "initial" indicates an image frame before or without the modifications described herein. The image data are a sequence of initial image frames 200 of the field of view of the camera 115. Each initial image frame 200 is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view of the sensor at the time that the image frame was recorded, can be specified in pixel dimensions or coordinates, e.g., an ordered pair of pixel distances, such as a number of pixels from a top edge and a number of pixels from a left edge of the image frame. Alternatively to receiving the initial image frame 200 from the camera 115, the initial image frame 200 may be received as part of a previously generated dataset of images from a third party.

The initial image frame 200 includes personally identifiable information (PII) 205, e.g., someone may be capable of uniquely identifying an individual from the data in the initial image frame, e.g., using algorithms such as facial recognition or optical character recognition. For the purposes of this disclosure, "personally identifiable information" is defined as a representation of information that permits the identity of an individual to whom the information applies to be reasonably inferred. For example, the initial image frame 200 can include a face of a person, e.g., of a pedestrian in the vicinity of the vehicle 100 as the vehicle 100 travels. For another example, the initial image frame 200 can include a depiction of text, e.g., on a license plate of another vehicle as shown in FIG. 2.

The computer 105, 145 is programmed to identify the PII 205 in the initial image frame 200. For example, the computer 105, 145 can identify the PII 205 using conventional image-recognition techniques, e.g., a convolutional neural network programmed to accept the initial image frame 200 as input and output at least one classification of an object in the initial image frame 200. For example, the output may be a list of bounding boxes around objects with a specific classification (e.g., "face") and corresponding confidences of that classification applying to the respective object, e.g., $\{x_{left1}, y_{top1}, x_{right1}, y_{bottom1}, 95\%; x_{left2}, y_{top2}, x_{right2}, y_{bottom2}, 87\%; \ldots\}$. The bounding boxes are described in more detail below. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential classification for the object, and the final output is the classification with the highest score. Alternatively, if a potential classification that is a type of PII 205 has a score above a threshold, the final output may be that classification even if a non-PII potential classification has a higher score. If the classification is a type of PII 205, then the computer 105, 145 has identified the PII 205.

For another example, the computer 105, 145 may use an algorithm purpose-built for a specific type of PII 205, e.g., faces or license plates, to identify the PII 205 in the initial image frame 200. For faces, as an example, the computer 105, 145 may detect the face in the initial image frame 200, e.g., by using any suitable facial-detection technique, e.g., knowledge-based techniques such as a multiresolution rule-based method; feature-invariant techniques such as grouping of edges, space gray-level dependence matrix, or mixture of Gaussian; template-matching techniques such as shape template or active shape model; cascade classifiers such as for Haar-like features; or appearance-based techniques such as eigenface decomposition and clustering, Gaussian distribution and multilayer perceptron, neural network, support vector machine with polynomial kernel, a naive Bayes classifier with joint statistics of local appearance and position, higher order statistics with hidden Markov model, or Kullback relative information.

Additionally, the computer 105, 145 may identify the PII 205 in the initial image frame 200 based on identifications of the PII 205 in earlier or later image frames. For example, the computer 105, 145 may execute a Kalman filter or particle filter to identify the PII 205 in image frames in which the classification techniques described above have temporarily fallen below the confidence threshold for identification.

The computer 105, 145 may be programmed to define a region 210 containing the PII 205. For example, the regions 210 may be defined by bounding boxes 215 enclosing the respective regions 210. The computer 105, 145 may be programmed to generate the respective bounding boxes 215 around the identified PII 205. Each bounding box 215 can be defined by, e.g., pixel coordinates of opposite corners of the bounding box 215, thereby specifying a rectangle. For example, the computer 105, 145 may generate the bounding boxes 215 around what the computer 105, 145 identified as the PII 205. The computer 105, 145 may generate each bounding box 215 to be a minimum size encompassing the respective PII 205, e.g., by using the highest and lowest vertical pixel coordinates and leftmost and rightmost horizontal pixel coordinates of the region 210 to make the pair of pixel coordinates for the bounding box 215.

The computer 105, 145 is programmed to encode the region 210 containing the PII 205 to a latent vector 220. The latent vector 220 preserves certain information about the object with the PII 205. The term "latent vector" is used in its machine-learning sense as a representation of a subset of input data in a more compact form than the input data. In this application, the latent vector 220 has a lower dimensionality than the region 210 encoded into the latent vector 220. For example, a region 210 that is 100 pixels by 100 pixels may be encoded into a 15×1 latent vector 220. The latent vector 220 may encode non-personally identifying data about the object with the PII 205, e.g., about a face or a license plate. For example, a latent vector 220 of a face may encode the fact that the object include a face, an orientation of the face (i.e., what direction the face is facing), whether the eyes are open or closed, what direction the eyes are looking, a facial expression, etc., and the latent vector 220 of the face may lack dimensions associated with features of the face from which a facial-recognition algorithm or human viewer (once the image is reconstructed) may be able to uniquely identify the face. For another example, a latent vector 220 of a license plate may encode the fact that the object is a license plate, a color scheme (e.g., the colors of the background and the letters), etc., and the latent vector 220 of the license plate may lack the specific characters displayed on the license plate. (The algorithm for encoding the region 210 to the latent vector 220 will be discussed below with respect to FIG. 3.)

The computer 105, 145 is programmed to anonymize the region 210 from the initial image frame 200, resulting in a modified image frame 225. For example, the computer 105, 145 may delete the region 210 from the initial image frame 200, e.g., by overwriting the pixels of the region 210 with data not derived from the region 210, e.g., solid black as shown in FIG. 2. For another example, the computer 105, 145 may blur the region 210 of the initial image frame 200. Blurring the region 210 can be based on contents of the region 210. For example, the computer 105, 145 can use any suitable blurring techniques that transform the contents of the region 210, e.g., Gaussian blurring. Beneficially, the modified image frame 225 thus lacks the PII 205.

The computer 105, 145 is programmed to associate the latent vector 220 with the modified image frame 225. For example, the computer 105, 145 may store the latent vector 220 as part of the modified image frame 225, e.g., embedding the latent vector 220 in the modified image frame 225 (as shown in FIG. 2), or as metadata of the modified image frame 225. The modified image frame 225 with the latent vector 220 has a same dimensionality as the initial image frame 200. In particular, the latent vector 220 may be embedded to a subpart of the region 210 of the modified image frame 225 that formerly contained the PII 205, e.g., as part of the overwriting described immediately above, with padding 230 for the rest of the pixels of the region 210. As part of the embedding, the computer 105, 145 may cast the latent vector down to an image dtype (i.e., a data type object) of the modified image frame 225, e.g., int8, int12, etc. The latent vector 220 will occupy less than the entire region 210 because of the lower dimensionality of the latent vector 220 than the region 210. For another example, the computer 105, 145 may store the latent vector 220 in a file or database referencing an index of the modified image frame 225 and pixel coordinates of the region 210 within the modified image frame 225. The index may specify the specific camera 115 that generated the corresponding initial image frame 200 and the time at which the corresponding initial image frame 200 was generated. By associating the latent vector 220 with the modified image frame 225, the computer 105, 145 can provide the modified image frame 225 and the latent vector 220 together as an input to an algorithm for which the latent vector 220 provides useful information, or the vehicle computer 105 can transmit the modified image frame 225 and the latent vector 220 together to the remote server 145, as described below. The computer 105, 145 may also associate the bounding box 215 defining the region 210 with the modified image frame 225, thereby providing an identification of where the anonymization occurred in the modified image frame 225.

The vehicle computer 105 may be programmed to transmit the modified image frame 225 with the latent vector 220 (and possibly the bounding box 215) to the remote server 145. For example, the vehicle computer 105 may instruct the transceiver 140 to transmit a message containing the modified image frame 225 and the latent vector 220 to the remote server 145. The vehicle computer 105 may be programmed to refrain from transmitting the initial image frame 200 to the remote server 145, thereby not transmitting the PII 205 outside of the vehicle 100.

From the remote server 145, the modified image frames 225 and latent vectors 220 may be used as training data or test data for machine-learning algorithms, e.g., research, validation, verification, etc. of ADAS features. (This use is distinct from the machine-learning algorithms described below.) Beneficially, the modified image frames 225 lack the PII 205, while the latent vectors 220 still contain data that the algorithms would have derived from the PII 205. Such data may be used to regenerate generic versions of the PII 205, e.g., a face different than a face that appeared in the initial image frame 200, e.g., by using techniques such as generative neural networks. The combination of modified image frames 225 and latent vectors 220 thus serves as more accurate training data or test data than image data from which PII 205 has been anonymized without the addition of the latent vector 220.

Figure 3:
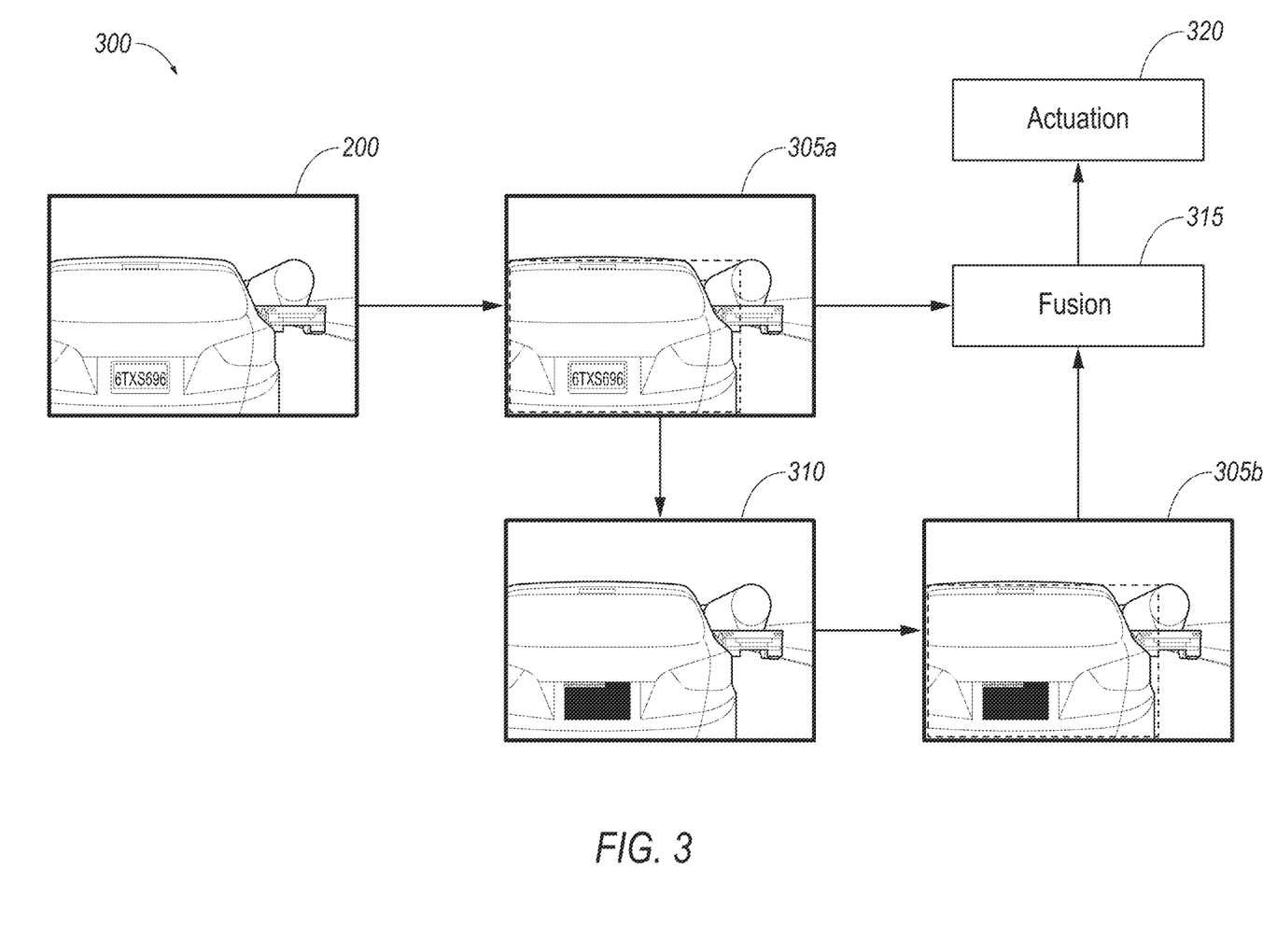
FIG. 3 is a diagram of an example machine-learning architecture on board the vehicle.

With reference to FIG. 3, the computer 105, 145 may store a machine-learning architecture 300. The computer 105, 145 may execute a machine-learning perception algorithm 305 of the machine-learning architecture 300 using the initial image frame 200 and the modified image frame 225 with the latent vector 220 as inputs. Executing the machine-learning perception algorithm 305 with both the initial image frame 200 and the modified image frame 225 with the latent vector 220 may increase an accuracy of the machine-learning perception algorithm 305. For example, the machine-learning architecture 300 may include a first instance 305a of the machine-learning perception algorithm 305, a machine-learning encoder 310, a second instance 305b of the machine-learning perception algorithm 305, and a fusion algorithm 315. The first instance 305a of the machine-learning perception algorithm 305 may take the initial image frame 200 as input and output first identifications of objects in the field of view of the camera 115. The machine-learning encoder 310 may encode the region 210 containing the PII 205 of the initial image frame 200 to the latent vector 220. Combined with the steps of anonymizing the region 210 to arrive at the modified image frame 225 and associating the latent vector 220 with the modified image frame 225 described above, the machine-learning encoder 310 produces the modified image frame 225 with the latent vector 220. The second instance 305b of the machine-learning perception algorithm 305 may take the modified image frame 225 with the latent vector 220 as an input, and output second identifications of the objects in the field of view of the camera 115. The fusion algorithm 315 may combine the first and second identifications into final identifications. The final identifications from the machine-learning architecture 300 may be used to actuate the vehicle 100 in an actuation step 320. By using an alternative analysis of the initial image frame 200 (i.e., the modified image frame 225 with the latent vector 220), the machine-learning architecture 300 may provide more accurate identifications than by solely using the initial image frame 200.

The computer 105, 145 may be programmed to execute the first instance 305a of the machine-learning perception algorithm 305 using the initial image frame 200 as an input.

The machine-learning perception algorithm 305 may be, e.g., a convolutional neural network programmed to accept images as input and output identifications of objects in the images. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential identification for an object, and the final output for an object is the identification with the highest score. The identifications from the first instance 305a will be referred to as "first identifications."

The computer 105, 145 may be programmed to encode the region 210 containing the PII 205 of the initial image frame 200 to the latent vector 220. For example, the computer 105, 145 may execute the machine-learning encoder 310 on the PII 205 to encode the PII 205 to the latent vector 220. The machine-learning encoder 310 may be or include an artificial neural network such as a residual neural network (ResNet). The machine-learning encoder 310 may be taken from an encoder-decoder architecture 405, as described below with respect to FIG. 4. The machine-learning encoder 310 may include a sequence of layers and may reduce a dimensionality of the data from one layer to the next layer. The output of the final layer may be the latent vector 220.

The computer 105, 145 may be programmed to execute the second instance 305b of the machine-learning perception algorithm 305 using the modified image frame 225 with the latent vector 220 as an input, in the same manner as described above for the first instance 305a. The identifications from the second instance 305b will be referred to as "second identifications." The second identification for a given object may be the same as or different than the first identification for that object.

The computer 105, 145 may be programmed to execute the fusion algorithm 315, e.g., taking the first identifications and the second identifications as inputs. The fusion algorithm 315 may perform sensor fusion. Sensor fusion is combining data from disparate sources together so that the resulting data has less uncertainty than if the data from each source were used individually, e.g., in creating a unified model of the surrounding environment of the vehicle 100. The sensor fusion can be performed with one or more algorithms, e.g., Kalman filter, central limit theorem, Bayesian networks, Dempster-Shafer, convolutional neural networks, etc. As one example, the fusion algorithm 315 may employ ensemble learning. Ensemble learning combines predictions from multiple algorithms. The computer 105, 145 may use any suitable type of ensemble learning. e.g., Bayes optimal classifier, boosting, Bayesian model averaging, Bayesian model combination, bucket of models, voting, etc. The fusion algorithm 315 outputs final identifications for the objects based on the respective first identifications and second identifications.

The vehicle computer 105 may be programmed to actuate a component of the vehicle 100 based on the modified image frame 225 with the latent vector 220. For example, the vehicle computer 105 may actuate the component based on the final identifications from the fusion algorithm 315. The actuation of the component is thus based indirectly on the output of the machine-learning perception algorithm 305, as well as on the modified image frame 225 with the latent vector 220. In other words, the modified image frame 225 with the latent vector 220 may be an input to a software stack leading to actuation of a component of the vehicle 100. The component may include, e.g., the propulsion system 120, the brake system 125, the steering system 130, and/or the user interface 135. For example, the vehicle computer 105 may actuate the component as part of executing an advanced driver assistance system (ADAS). ADAS are electronic technologies that assist drivers in driving and parking functions. Examples of ADAS include forward proximity detection, lane-departure detection, blind-spot detection, braking actuation, adaptive cruise control, and lane-keeping assistance systems. The vehicle computer 105 may actuate the brake system 125 to brake the vehicle 100 or actuate the user interface 135 to output a message to the operator in response to an identification of an object as a person at a certain position relative to the vehicle 100. For another example, the vehicle computer 105 may operate the vehicle 100 autonomously, i.e., actuating the propulsion system 120, the brake system 125, and the steering system 130 based on the environment as detected by the camera 115 and other sensors with the final identifications, e.g., to navigate around the environment.

The machine-learning architecture 300 may alternatively have a different form than shown in FIG. 3. For example, the machine-learning perception algorithm 305 may include the machine-learning encoder 310, e.g., within the layers of the convolutional neural network. The computer 105, 145 may execute the machine-learning perception algorithm 305 as a single instance using the initial image frame 200 and the modified image frame 225 with the latent vector 220 as inputs. The identifications provided by the single instance of the machine-learning perception algorithm 305 may then be used in the actuation step 320. For another example, machine-learning perception algorithm 305 may perform a different task than identification, such as depth estimation, object orientation, pedestrian trajectory estimation, etc.

Figure 4:
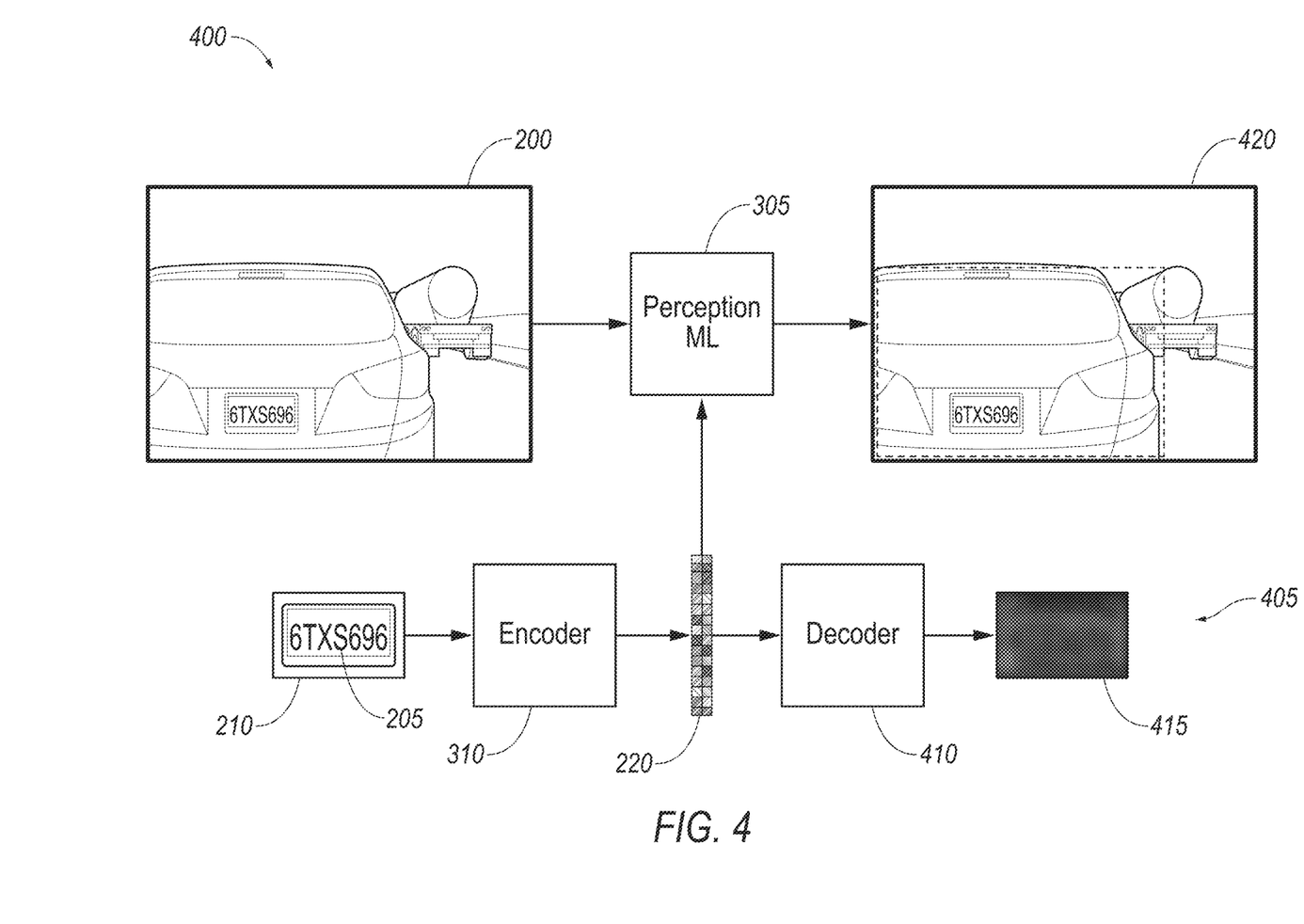
FIG. 4 is a diagram of an example training architecture for training the machine-learning architecture.

With reference to FIG. 4, a training architecture 400 may be used for training the machine-learning perception algorithm 305 and/or the machine-learning encoder 310. The machine-learning perception algorithm 305 and the machine-learning encoder 310 may be jointly trained with the latent vector 220 outputted by the machine-learning encoder 310 being inputted to the machine-learning perception algorithm 305. The machine-learning encoder 310 is trained as part of an encoder-decoder architecture 405 including a decoder 410. Training data of input image frames are provided as input to the machine-learning perception algorithm 305 and the encoder-decoder architecture 405, and the respective latent vectors 220 generated by the machine-learning encoder 310 are provided as additional inputs to the machine-learning perception algorithm 305. The machine-learning perception algorithm 305 outputs identifications 420 of the objects in the initial image frames 200. The training architecture 400 is trained to correctly identify the objects in the input image frames and to reconstruct the regions 210 of the input image frames containing the PII 205.

The machine-learning encoder 310 is trained as part of an encoder-decoder architecture 405 to reconstruct the region 210 of the initial image frame 200. The encoder-decoder architecture 405 includes the machine-learning encoder 310 followed in series by the decoder 410. The decoder 410 takes the output of the machine-learning encoder 310, i.e., the latent vector 220, as input. The decoder 410 may be or include an artificial neural network such as a ResNet. The decoder 410 may include a series of layers and may increase a dimensionality of the data from one layer to the next. The output of the final layer may be a reconstruction 415 of the region 210 containing the PII 205. The reconstruction 415 may have a same dimensionality as the region 210.

The machine-learning perception algorithm 305 is jointly trained with the encoder-decoder architecture 405. The machine-learning perception algorithm 305 and encoder-decoder architecture 405 are interconnected as described above, receive the same training data, and are updated using the same loss function(s) (described below). For example, the weights of connections between layers of the machine-learning perception algorithm 305 and the encoder-decoder architecture 405 may be updated using backpropagation to minimize the value of the loss function, as is known. The joint training helps the machine-learning encoder 310 produce a latent vector 220 with information useful to the machine-learning perception algorithm 305, and the joint training helps the machine-learning perception algorithm 305 use the latent vector 220 to increase the accuracy of the identifications 420.

The loss function may include a reconstruction loss and/or an identification loss. The reconstruction loss measures similarity between an output of the encoder-decoder architecture 405, i.e., the reconstruction 415, and the region 210 of the initial image frame 200 inputted to the encoder-decoder architecture 405. The similarity may be expressed in at the level of pixels, at the level of features, or some other aspect. For the purposes of this disclosure, the term "feature" is used in its computer-vision sense as a piece of information about the content of an image, specifically about whether a certain region of the image has certain properties. The identification loss measures an accuracy at correctly producing the identifications 420 of the objects in the input image frames. The training data may include annotations giving the ground-truth identifications, and the identifications 420 from the machine-learning perception algorithm 305 may be compared to the annotations. For example, the loss function may be the sum of the reconstruction loss and the identification loss.

Figure 5:
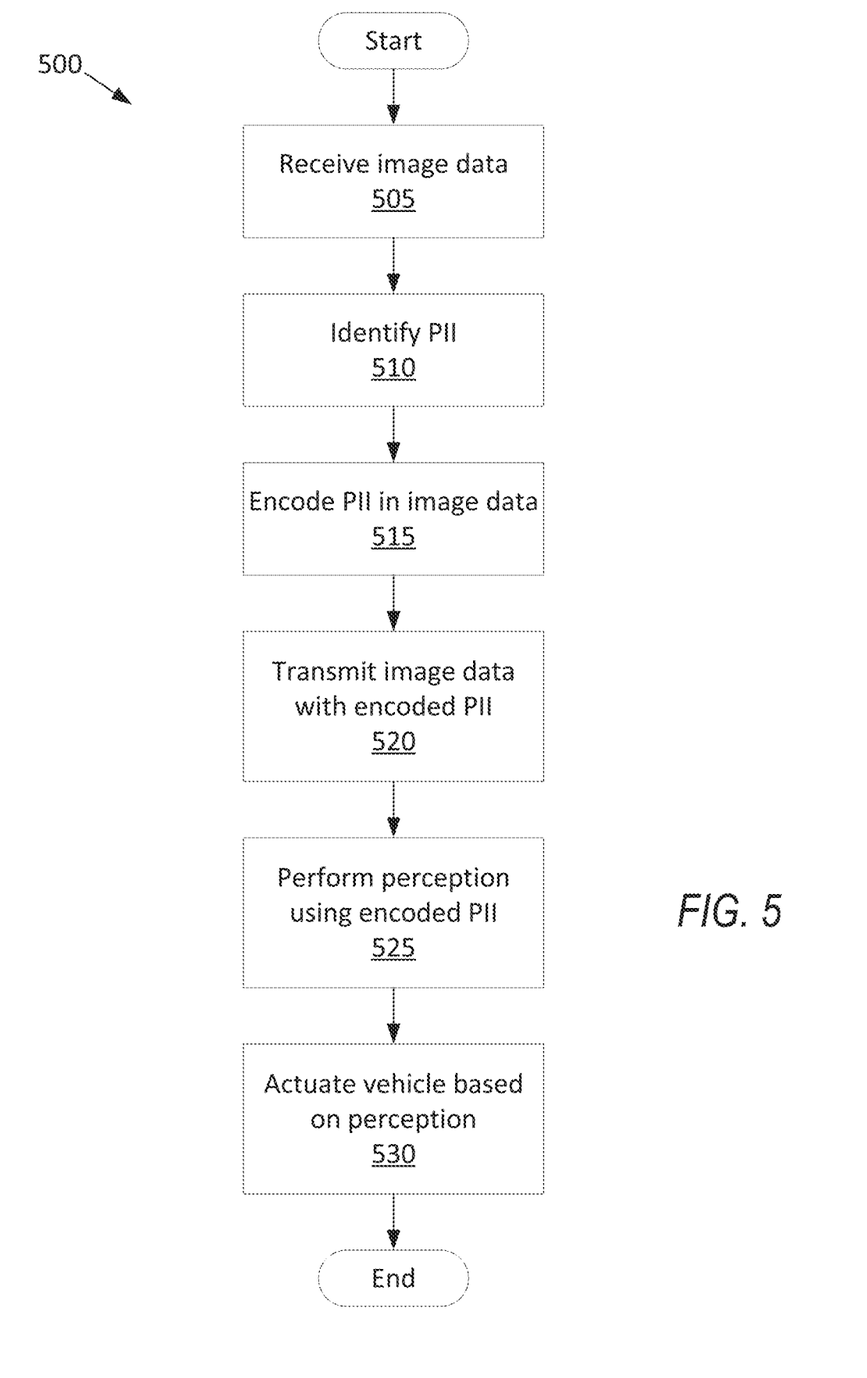
FIG. 5 is a flowchart of an example process for controlling the vehicle with the machine-learning architecture.

FIG. 5 is a flowchart illustrating an example process 500 for controlling the vehicle 100 with the machine-learning architecture 300. The memory of the computer 105, 145 stores executable instructions for performing the steps of the process 500 and/or programming can be implemented in structures such as mentioned above. In particular, the process 500 may be performed entirely by the vehicle computer 105. As a general overview of the process 500, the vehicle computer 105 receives the initial image frame 200, identifies the PII 205 in the initial image frame 200, encodes the PII 205 to the latent vector 220 and anonymizes the region 210 from the initial image frame 200 to associate the latent vector 220 with the now-modified image frame 225, transmits the modified image frame 225 with the latent vector 220 to the remote server 145, executes the machine-learning perception algorithm 305, and actuates a component of the vehicle 100.

The process 500 begins in a block 505, in which the vehicle computer 105 receives the initial image from the camera 115, as described above.

Next, in a block 510, the vehicle computer 105 identifies the PII 205 in the initial image frame 200, as described above.

Next, in a block 515, the vehicle computer 105 encodes the PII 205 to the latent vector 220, anonymizes the region 210 containing the PII 205 from the initial image frame 200 to get the modified image frame 225, and associates the latent vector 220 with the modified image frame 225, as described above.

Next, in a block 520, the vehicle computer 105 transmit the modified image frame 225 with the latent vector 220 to the remote server 145, as described above.

Next, in a block 530, the vehicle computer 105 executes the machine-learning perception algorithm 305, e.g., as part of executing the machine-learning architecture 300, using the modified image frame 225 with the latent vector 220 as an input, as described above. The vehicle computer 105 thereby generates identifications of objects in the initial image frame 200.

Next, in a block 535, the vehicle computer 105 actuates a component of the vehicle 100 based on the output of the machine-learning architecture 300, e.g., the identifications of the objects in the initial image frame 200, as described above. Actuating the component is thus based indirectly on the modified image frame 225 with the latent vector 220. After the block 535, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), a vector database, etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   identify personally identifiable information (PII) in an initial image frame;
   encode a region containing the PII of the initial image frame to a latent vector with a lower dimensionality than the region;
   anonymize the region from the initial image frame, resulting in a modified image frame;
   associate the latent vector with the modified image frame;
   execute a machine-learning perception algorithm using the modified image frame with the latent vector as an input; and
   actuate a component of a vehicle based on the modified image frame with the latent vector and based on an output of the machine-learning perception algorithm.

2. The computer of claim 1, wherein the instructions further include instructions to receive the initial image frame from a camera of the vehicle.

3. The computer of claim 1, wherein the instructions further include instructions to execute the machine-learning perception algorithm using the initial image frame and the modified image frame with the latent vector as inputs.

4. The computer of claim 1, wherein the instructions further include instructions to embed the latent vector in the modified image frame.

5. The computer of claim 1, wherein the modified image frame with the latent vector has a same dimensionality as the initial image frame.

6. The computer of claim 1, wherein the instructions further include instructions to transmit the modified image frame with the latent vector to a remote server.

7. The computer of claim 6, wherein the instructions further include instructions to refrain from transmitting the initial image frame to the remote server.

8. The computer of claim 1, wherein the PII includes a face of a person.

9. The computer of claim 8, wherein the latent vector encodes non-personally identifying data about the face.

10. The computer of claim 1, wherein the PII includes a depiction of text.

11. The computer of claim 1, wherein the instructions further include instructions to execute a machine-learning encoder on the PII to encode the PII to the latent vector.

12. The computer of claim 11, wherein the machine-learning encoder is trained as part of an encoder-decoder architecture to reconstruct the region of the initial image frame.

13. The computer of claim 12, wherein the encoder-decoder architecture is trained using a loss function that includes a reconstruction loss measuring similarity between an output of the encoder-decoder architecture and the region of the initial image frame inputted to the encoder-decoder architecture.

14. The computer of claim 11, wherein the machine-learning perception algorithm is jointly trained with the machine-learning encoder.

15. The computer of claim 14, wherein the machine-learning perception algorithm and the machine-learning encoder are jointly trained with the latent vector outputted by the machine-learning encoder being inputted to the machine-learning perception algorithm.

16. The computer of claim 14, wherein the machine-learning perception algorithm and the machine-learning encoder are jointly trained using a loss function that includes a loss measuring an accuracy at correctly identifying objects in input image frames.

17. A method comprising:
   identifying personally identifiable information (PII) in an initial image frame;

encoding a region containing the PII of the initial image frame to a latent vector with a lower dimensionality than the region;

anonymizing the region from the initial image frame, resulting in a modified image frame;

associating the latent vector with the modified image frame;

executing a machine-learning perception algorithm using the modified image frame with the latent vector as an input; and actuating a component of a vehicle based on the modified image frame with the latent vector and based on an output of the machine-learning perception algorithm.

18. A computer comprising a processor and a memory, the memory storing instructions executable by the processor to:

identify personally identifiable information (PII) in an initial image frame;

encode a region containing the PII of the initial image frame to a latent vector with a lower dimensionality than the region;

anonymize the region from the initial image frame, resulting in a modified image frame;

associate the latent vector with the modified image frame; and execute a machine-learning perception algorithm using the initial image frame and the modified image frame with the latent vector as inputs.

19. A computer comprising a processor and a memory, the memory storing instructions executable by the processor to:

identify personally identifiable information (PII) in an initial image frame;

encode a region containing the PII of the initial image frame to a latent vector with a lower dimensionality than the region;

anonymize the region from the initial image frame, resulting in a modified image frame;

associate the latent vector with the modified image frame;

execute a machine-learning encoder on the PII to encode the PII to the latent vector; and execute a machine-learning perception algorithm using the modified image frame with the latent vector as an input, wherein the machine-learning perception algorithm is jointly trained with the machine-learning encoder.

* * * * *